United States Patent Office 3,046,144
Patented July 24, 1962

3,046,144
PROCESS OF MAKING FROZEN
CONCENTRATED MILK
Douglas R. Braatz, 607 E. Lieg Ave., Shawano, Wis., and William C. Winder, 418 Critchell Terrace, Madison 5, Wis.
No Drawing. Filed Mar. 31, 1960, Ser. No. 18,823
3 Claims. (Cl. 99—192)

The present invention relates to a novel method for the production of frozen concentrated milk characterized by improved stability at storage temperatures above 0° F., e.g. about 10° F., and the resulting product.

One of the problems encountered when concentrated milk is held in a frozen state is destabilization of the protein. This problem has been studied by investigators working in this art since the Webb patent for frozen concentrated milk was granted in 1934.

The first indication of protein destabilization is a flocculant precipitate in the concentrate and an undesirable "chalkiness" in the reconstituted product. Eventually a gel-like structure is formed which tends to whey-off. At this stage the concentrate cannot be redispersed in water.

The rate of destabilization can be retarded by holding the concentrate at temperatures below 0° F. However, when held at temperatures above 0° F., e.g. 10° F. destabilization proceeds very rapidly and the body becomes unsatisfactory in from three to six weeks. This has discouraged the commercial production and marketing of frozen concentrated milk particularly for use in the home.

Included in the more recent attempts to solve this problem and specifically to develop a method to improve protein stability, is the process described in Stimpson Patent 2,668,765. The Stimpson process calls for hydrolysis of the lactose in the milk concentrate prior to freezing.

In our investigations in this field in an attempt to solve the problem through more or less normal processing procedures, we discovered that frozen concentrated milk with improved stability could be readily made providing (1) the concentrate, prior to freezing, was subjected to a post-condensing heat treatment of the type described below, and (2) the resulting heat treated concentrate was cooled and frozen without agitation. Instead of the usual 3 to 6 weeks storage life noted above, frozen concentrated milk prepared in accordance with the present improved process has a storage life of about 13 to 14 weeks at 10° F.

The concentrated milk used in the present invention can be prepared by conventional steps used in the art to prepare pasteurized, homogenized, condensed milk. The forewarming or pasteurizing treatment, for example, can be carried out at about 143° F. for about 30 minutes or at about 163° F. for about 16 seconds, with the use of the lower forewarming temperatures up to about 150° F. being preferred. Homogenization of the milk can be carried out in standard equipment, e.g. at 2000–2500 p.s.i., and can be carried out either before or after condensing with the former being preferred. The condensing operation can also be carried out in accordance with standard procedures with the use of condensing temperatures below about 140° F. being preferred. In this operation the milk can be reduced to ½ of its original volume with a reduction to at least about one-third its original volume, with the resulting product standardized to about 36% total solids, being preferred.

The post-condensing heat treatment of the pasteurized, homogenized, condensed milk is a critical step in the process of the present invention. It can be carried out before or after packaging, as noted below, and can be best carried out using temperatures at about 150–160° F. for about 20–30 minutes, with a temperature of about 155° F. for about 25 minutes being preferred. With a holding time of 20 minutes, temperatures below 140° F. caused no increase in storage life while temperatures above 180° F. caused a decrease in storage life. Also, with a temperature of 155° F., holding times up to about 30 minutes caused storage life to increase progressively while holding times longer than 30 minutes caused storage life to decrease progressively as the time of holding increased. Optimum temperatures and holding times may vary with the particular concentrate being treated but can be readily ascertained by preliminary test. Investigations to date, however, indicate that storage life of the concentrate starts to improve as the temperature goes above 140° F., reaches a maximum within the 150–160° F. temperature range with holding times within the 20–30 minute range.

The concentrate can be packaged under atmospheric pressure in various types of containers with tinned steel containers, e.g. cans of the type used for canned evaporated milk, frozen orange juice and the like, being preferred. Vacuum or nitrogen packaging can also be used although their use has indicated no appreciable difference in storage life to that obtainable with atmospheric packaging. The packaging operation, as noted above, can be carried out either before or after the post-condensing heat treatment with the former being generally preferred.

The cooling and freezing of the heat treated concentrate is also a critical step in the process of the present invention and can be best carried out without agitation with the packaged or canned concentrate being maintained in a quiescent state until frozen. Investigations have shown, however, that agitation of the concentrate has a small effect as the concentrate cools down to about 105° F. and that the major decrease in storage life takes place when the concentrate is agitated after the temperature drops below about 105° F., and becomes more pronounced as the temperature decreases. It is for this reason that agitation should be avoided as the temperature drops to about 105° F. and preferably avoided at all temperatures.

Agitation of the concentrate during freezing was found to be detrimental, also. A concentrate prepared in accordance with the present invention, for example, and frozen quiescently in a room at −7° F. had a storage life at 10° F. of 14 weeks compared to 4 weeks for the same product frozen with agitation in an ice cream freezer. The rate of freezing itself was not found to affect storage life as long as the concentrate was not agitated during freezing. A concentrate prepared in accordance with the present invention and frozen in 2.5 hours, for example, was found to have a storage life equivalent to that of a concentrate frozen in 7 minutes.

The following example will serve to illustrate the invention.

Example

Clarified whole milk of high quality was first subjected to a forewarming heat treatment at about 143° F. for about 30 minutes and the resulting pasteurized milk then homogenized at about 2500 p.s.i. The homogenized milk was next condensed under vacuum at a temperature of about 110° F. to about one-third of its original volume and the resulting product then standardized to about 36% total solids in accordance with standard practices in the art. The resulting concentrate was next packaged and sealed in tinned steel cans under atmospheric pressure and then heated to about 155° F. and held at this temperature for about 25 minutes. The canned hot concentrate was next cooled without agitation and the cooled concentrate then frozen while maintained in the quiescent state. The resulting product when stored at 10° F. has a storage life of about 3–4 months and can be readily reconstituted by mixing the canned concentrate with two equal portions of water.

The reasons why the process of the present invention results in frozen concentrated milk characterized by improved stability at storage temperatures above 0° F. is not fully or completely known or understood. Investigations, however, have shown that once lactose crystals appear in the concentrate, there is a simultaneous aggregation of protein which is soon followed by the appearance of the gel-like structure referred to above. In view of this, one factor that may be involved is that the post-condensing heat treatment dissolves all lactose which may have precipitated or crystallized from solution during processing and that the lactose remains in solution when the concentrate is cooled and frozen without agitation even though the lactose solution becomes supersaturated at the lower temperatures. Another possible factor that may be involved is that with all the lactose in solution, the lactose acts indirectly to prevent aggregation of the protein molecules.

Regardless of the theory of operation, flavor studies of the frozen concentrated milk prepared in accordance with the present invention, in which the reconstituted product was compared with fresh fluid milk, have demonstrated that the concentrate was usually not correctly identified until after 13 weeks storage at 10° F. At this time the concentrate showed no evidence of an oxidized or stale flavor, identification being by the "chalkiness" of the reconstituted product. Consumer acceptance surveys conducted with 225 families selected at random have also demonstrated that about 85% considered the flavor of the reconstituted concentrate as good as or better than fresh fluid milk.

It will be understood by those skilled in the art that the process of the present invention can be modified or varied by use of equivalent means. The post condensing heat treatment, for example, while vital and essential in the process, can be carried out in various ways such as by keeping the milk hot in the condensing pans, removing the condensed milk at a temperature around 150–160° F. and following this with an additional heat treatment of the condensed milk. In this case, the amount of additional treatment required would depend upon the time the milk had been held at 150–160° F. in the pans and would obviously be less than milk receiving no heat treatment in the prescribed range in the condensing pans. As noted above, the sum or overall heat treatment required for optimum results in any particular processing operation can be readily ascertained by preliminary test.

It is claimed:

1. In the method of preparing frozen concentrated milk characterized by improved stability when stored at a temperature of about 10° F., the improvement which comprises subjecting pasteurized, homogenized, condensed milk to a temperature of about 150–160° F. for about 20–30 minutes, cooling the resulting hot concentrate in the absence of agitation after the temperature drops to about 105° F. and then freezing the cooled concentrate while maintaining the concentrate in a quiescent state.

2. The method of claim 1, wherein the pasteurized, homogenized, condensed milk is heated to about 155° F. and held at this temperature for about 25 minutes, and the resulting hot concentrate is cooled and frozen without agitation.

3. The method of preparing frozen concentrated milk characterized by improved stability when stored at a temperature of about 10° F., which comprises subjecting whole milk to a forewarming heat treatment at about 143° F. for about 30 minutes, homogenizing the resulting pasteurized product, condensing the resulting homogenized product to about one-third its original volume at vapor temperatures below 140° F., standardizing the resulting concentrate to about 36% total solids, packaging the resulting concentrate, subjecting the packaged concentrate to a temperature of about 155° F. for about 25 minutes, cooling the hot concentrate without agitation and then quiescently freezing the cooled concentrate.

References Cited in the file of this patent

UNITED STATES PATENTS

| | | |
|---|---|---|
| 1,964,279 | Webb | June 26, 1934 |
| 2,470,020 | Crowley | May 10, 1949 |
| 2,668,765 | Stimpson | Feb. 9, 1954 |
| 2,822,277 | Ellertson et al. | Feb. 4, 1958 |

OTHER REFERENCES

"Milk Can Be Frozen For Sale To Consumers," by F. J. Doan and J. G. Leeder, Food Industries, July 1944, vol. 16, page 532.

Tumerman et al.: J. Dairy Science, vol. 37, 1954, pages 830–839, page 830 relied on.

Bell: "Use of Sucrose in the Preservation of Frozen Condensed Skimmilk," reprinted from The Milk Products Journal, September 1957.

Dedication 3,046,144.—*Douglas R. Braatz*, Shawano, and *William C. Winder*, Madison, Wis. PROCESS OF MAKING FROZEN CONCENTRATED MILK. Patent dated July 24, 1962. Dedication filed May 14, 1965, by the inventors.

Hereby dedicates to the public the remaining term of said patent.

[*Official Gazette August 17, 1965.*]